United States Patent [19]

Olson

[11] Patent Number: 4,714,399

[45] Date of Patent: Dec. 22, 1987

[54] AUTOMATICALLY-GUIDED VEHICLE HAVING LOAD CLAMP

[75] Inventor: John E. Olson, Portland, Oreg.

[73] Assignee: Cascade Corporation, Portland, Oreg.

[21] Appl. No.: 859,063

[22] Filed: May 2, 1986

[51] Int. Cl.⁴ .......................... B66F 9/00; B66F 9/06
[52] U.S. Cl. .................... 414/621; 414/618;
                              414/275; 901/45; 901/46; 901/49
[58] Field of Search ............. 414/621, 275, 618, 619;
                              901/46, 47, 49, 13; 180/167; 187/1 R, 9 R

[56] References Cited

U.S. PATENT DOCUMENTS

| | | | |
|---|---|---|---|
| 3,037,651 | 6/1962 | Smith | 250/222.1 |
| 3,219,207 | 11/1965 | Chasar | 414/275 |
| 3,486,640 | 12/1969 | Lemelson | 414/730 |
| 3,672,470 | 6/1972 | Ohntrup et al. | 187/1 |
| 3,990,594 | 11/1976 | Olson et al. | 414/621 |
| 4,212,375 | 7/1980 | Peterson et al. | 187/9 R |
| 4,279,328 | 7/1981 | Ahlbom | 187/9 R |
| 4,423,998 | 1/1984 | Inaba et al. | 414/730 |
| 4,605,354 | 8/1986 | Daly | 414/730 |
| 4,635,982 | 1/1987 | Feldmann | 901/49 X |
| 4,658,385 | 4/1987 | Tsuji | 901/46 X |
| 4,667,997 | 5/1987 | Udagawa et al. | 901/46 X |
| 4,682,153 | 7/1987 | Boozer et al. | 180/167 X |

FOREIGN PATENT DOCUMENTS

0035955 3/1979 Japan .................................. 414/275

Primary Examiner—James T. McCall
Attorney, Agent, or Firm—Chernoff, Vilhauer, McClung & Stenzel

[57] ABSTRACT

An automatically-guided, driverless vehicle for handling loads has a selectively openable and closeable load clamp. The clamp is equipped with various sensors for automatically sensing the load and other objects and surfaces surrounding the load, and controlling the movement of the clamp along a load-engaging direction, the vertical reciprocation of the clamp, and the opening and the closing of the clamp in response thereto.

23 Claims, 11 Drawing Figures

AUTOMATICALLY-GUIDED VEHICLE HAVING LOAD CLAMP

BACKGROUND OF THE INVENTION

This invention relates to materials handling vehicles having load-engaging clamps, and particularly to automatically-guided, driverless vehicles having clamps with automatic sensing functions.

Some load clamps having automatic sensing functions have existed in the past as evidenced, for example, by Smith U.S. Pat. No. 3,037,651 and Inaba et al, U.S. Pat. No. 4,423,998. Both of these clamps have sensors for regulating the forward approach of the load-engaging clamp pads to a cylindrical load prior to clamping so that, when the clamp arms ultimately close, the pads will engage the load in the proper position. However, both of these clamps require that the clamp pads ultimately extend forwardly of a forwardly-facing curved surface of the load (such as the rear surface of the axial opening of the roll in Smith, or the forward edge of the cylindrical load in Inaba). The problem with this type of structure is that many loads, such as ordinary cartons, require precise positioning of the clamp pads relative to a forwardly-facing load surface, but require that the pads not protrude forwardly of such surface because such protrusion would be likely to interfere with forwardly adjacent walls or other loads during engagement or depositing of the load. The Smith and Inaba structures can therefore not be used for cartons or other similar types of loads.

Moreover, load clamps for automatically-guided vehicles need to sense many other conditions involving the load itself, or the surfaces or objects surrounding the load, since the vehicle has no human operator to compensate for any variables with respect to these conditions. Such additional necessary sensing functions, not provided by the prior art, include the sensing of other forward-approach parameters such as obstacles between the clamp arms and forwardly thereof. For example, if a clamped load is to be deposited in a predetermined space, and an obstacle exists to the depositing of the load (such as the presence of another load in the space) sensors are required to detect this condition and interrupt the depositing operation. Or if the vehicle is moving forwardly without a clamped load and an object is sensed between the clamp arms and forwardly thereof in a location where no such object should exist, vehicle operation should likewise be interrupted. Also, if obstacles exist immediately ahead of the clamp arms, rather than in the forward space between them, this indicates that a load to be engaged, or an adjacent load, is transversely offset and will block full advancement of the clamp arms to a load-engaging position. In such case advancement of the clamp arms should be interrupted.

In addition to sensors governing the forward advancement of the clamp arms, sensors regulating vertical movement of the clamp arms on the vehicle'3 s load-elevating mast are likewise needed. For example, when a carton is to be engaged, it is necessary that the clamp pads be lowered to within a predetermined distance of the bottom of the carton, to ensure proper load engagement. Moreover, when a load is clamped, the presence of any sag in the bottom of the load, or any obstacle in a space where it is intended to deposit the load, should be sensed and the vertical movement of the clamp structure halted. Alternatively, when a clamped load is to be deposited at an elevated position on another load or other supporting surface, the presence or absence of such supporting surface should be sensed to determine if it is actually present before the load is released.

In addition to obstacles located forwardly and vertically with respect to the clamp arms, there is a need to sense obstacles located transversely outwardly of the clamp arms. For example, if opening of the clamp arms results in contact with such an obstacle, such opening should be interrupted. Alternatively, if forward or rearward motion of the vehicles results in such contact, such motion should likeiwse be interrupted.

Finally, conditions preventing floor-supported loads from being level, either in a transverse or forward direction, need to be sensed to avoid improper engagement of such loads.

Sensors have previously been used for aiding in the positioning of load-handling forks, as shown, for example, in Lemelson U.S. Pat. No. 3,486,640, Ohntrup et al., U.S. Pat. No. 3,672,470, Peterson et al, U.S. Pat. No. 4,212,375 and Ahlbom U.S. Pat. No. 4,279,328. However, because forks engage loads from beneath, rather than from the sides and from above, sensing principles applicable to forks are not useful in solving the problems of load clamps.

SUMMARY OF THE PRESENT INVENTION

The present invention satisfies all of the above-described needs for enabling loads, such as cartons and the like, to be handled without human intervention by load clamps.

Forward approach sensors properly position the clamp contact pads with respect to the forwardly-facing surface of the load preparatory to engagement, without physically sensing such surface or causing the pads to protrude beyond such surface, by sensing the location of the rearwardly-facing load surface and advancing the clamp arms a predetermined distance forwardly therefrom. Other sensors detect obstacles forwardly of and between the clamp arms and distinguish them from objects which are not obstacles. Further sensors sense obstacles which are forwarly aligned with the clamp pads. In response to the sensing of such forward obstacles, forward movement of the clamp arms is prevented.

Vertical positioning of the clamp contact pads relative to a load preparatory to engagement is accomplished by sensing of floor location for a floor-supported load. However, for an elevated load supported, for example, by another load, the top surface of the load is sensed while the pads are lowered, and the pads are further lowered a predetermined distance after such sensing to achieve proper vertical relationship to the load for clamping purposes. Other vertically-related sensors are provided for detecting load sag, and the presence of obstacles beneath a load where it is intended to deposit it. These sensors likewise are capable of distinguishing load sag and obstacles from expected objects. Vertical motion of the clamped load is automatically prevented in response to sag or obstacle sensing. The sensors can also distinguish between the abnormal absence of an underlying supporting surface where there should be one, and the normal absence of such a surface due to elevation of the load, and automatically prevent release of a clamped load in response to the abnormal condition. Still further sensors detect the absence of a level condition, in either the forward or transverse direction, adjacent the bottom of a floor-supported load, and automatically prevent engagement of the load by the clamp arms in response thereto.

Obstacles transversely located outside of the clamp arms are likewise sensed, and the further opening of the clamp arms, or advancement or retraction of the clamp arms, is interrupted automatically in response thereto.

Some of the sensors described above are preferably of the electro-optical type, while others are preferably of the contact type utilizing limit switches. However it will be understood that any of the sensors could be of either type without departing from the scope of the invention.

In most automatically-guided vehicles, the drive mechanism which advances the clamp arms into engagement with a load, and subsequently retracts the clamp arms, is the same drive mechanism which propels the vehicle along its path of travel. In such case the load-engaging direction of the vehicle is also its forward direction of travel. However, within the scope of the present invention, the vehicle drive system which advances the clamp arms in a load-engaging direction, and retracts them, can be other than the drive mechanism which propels the vehicle along its path of travel. For example, a drive system which operates a transverse reach mechanism which extends and retracts the clamp arms transversely to the direction of travel of the vehicle would constitute such a separate drive system.

The foregoing and other objectives, features, and advantages of the invention will be more readily understood upon consideration of the following detailed description of the invention, taken in conjunction with the accompanying drawings.

DESCRIPTION OF THE PREFERRED EMBODIMENT

The Vehicle

Figures 1, 3:
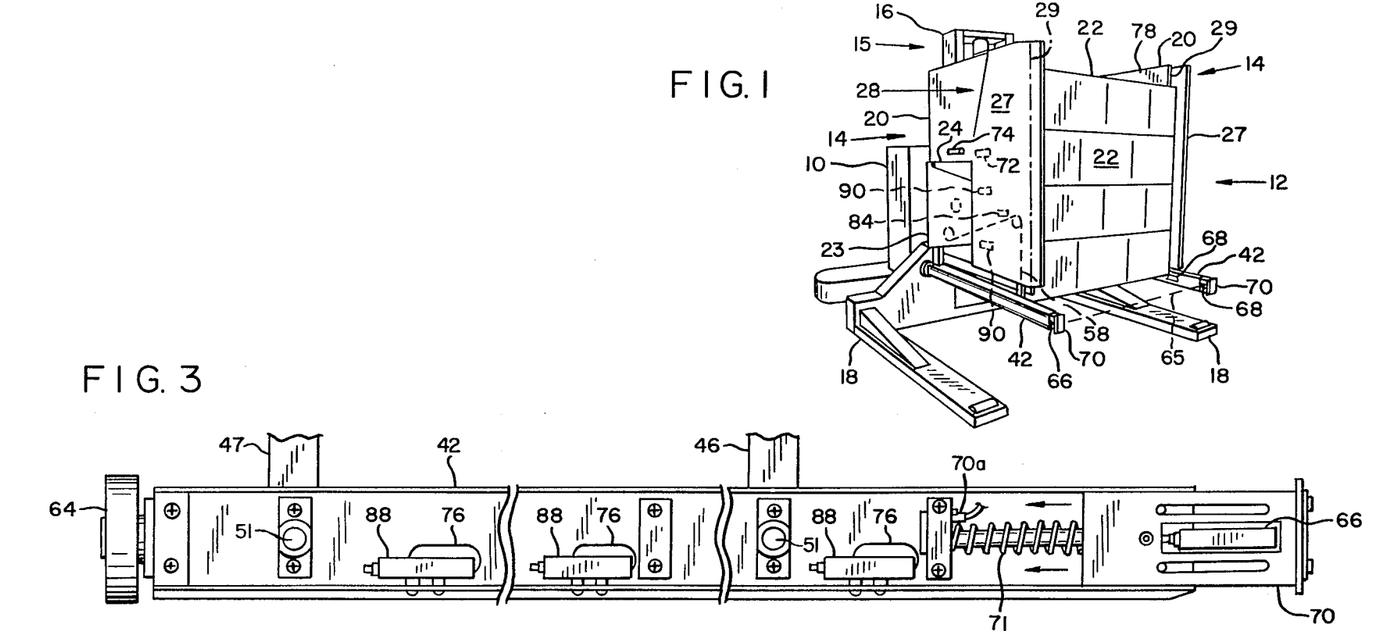
FIG. 1 is a perspective view of an exemplary embodiment of an automatically-guided vehicle with a load clamp constructed in accordance with the present invention.
FIG. 3 is an enlarged, extended side view of one of the sag bars which depends from a respective arm of the load clamp of FIGS. 1 and 2.

Referring to FIG. 1, a preferred embodiment of the load clamp of the present invention is adapated to be used in conjunction with a driverless, or automatically guided, vehicle 10. Driverless vehicles for use in warehousing and load handling applications typically include an intelligent processing unit for controlling the vehicle's operation in response to external signals. Such vehicles can be guided from station to station within the warehouse electromagnetically by a current-carrying wire buried in the warehouse floor as disclosed in U.S. Pat. Nos. 4,456,088, 4,247,896, and 3,768,586. The vehicle 10 shown in FIG. 1 includes a drive system, including a drive motor, for reversibly moving the vehicle along the floor or supporting surface, and a steering system for guiding the vehicle. The exemplary vehicle shown in FIG. 1 also includes a pair of outrigger supports 18 extending forwardly of the vehicle to enable the vehicle to lift and support a load 22. Alternatively, a counterweight at the rear of the vehicle may be used to counterbalance the mass of a load which is supported by the load clamp.

The Load Clamp

In the preferred embodiment shown in FIG. 1, the vehicle includes a load clamp 12 on the front portion of the vehicle. The load clamp includes a pair of opposed clamp arm assemblies 14 extending forwardly from the vehicle in a load-engaging direction which, for the vehicle pictured, is also the direction of travel. The clamp arm assemblies may be moved vertically with respect to the vehicle by a conventional lift system 15, partially shown in FIGS. 1 and 2, incorporating a vertically oriented mast 16 and a mast motor of either the electric or hydraulic type, not shown. A powered clamping mechanism 17, partially shown in FIG. 2, including clamping motors of either the electric or hydraulic type, enables the clamp arm assemblies to be transversely opened and closed. The clamping mechanism may be actuated by an arrangement of hydraulic cylinders or, more preferably, by electrically driven ball screws. The clamping mechanism disclosed in U.S. Pat. No. 4,279,564, incorporated by reference herein, is exemplary of the general type suitable for use with the load clamp of the preferred embodiment.

Figure 2:
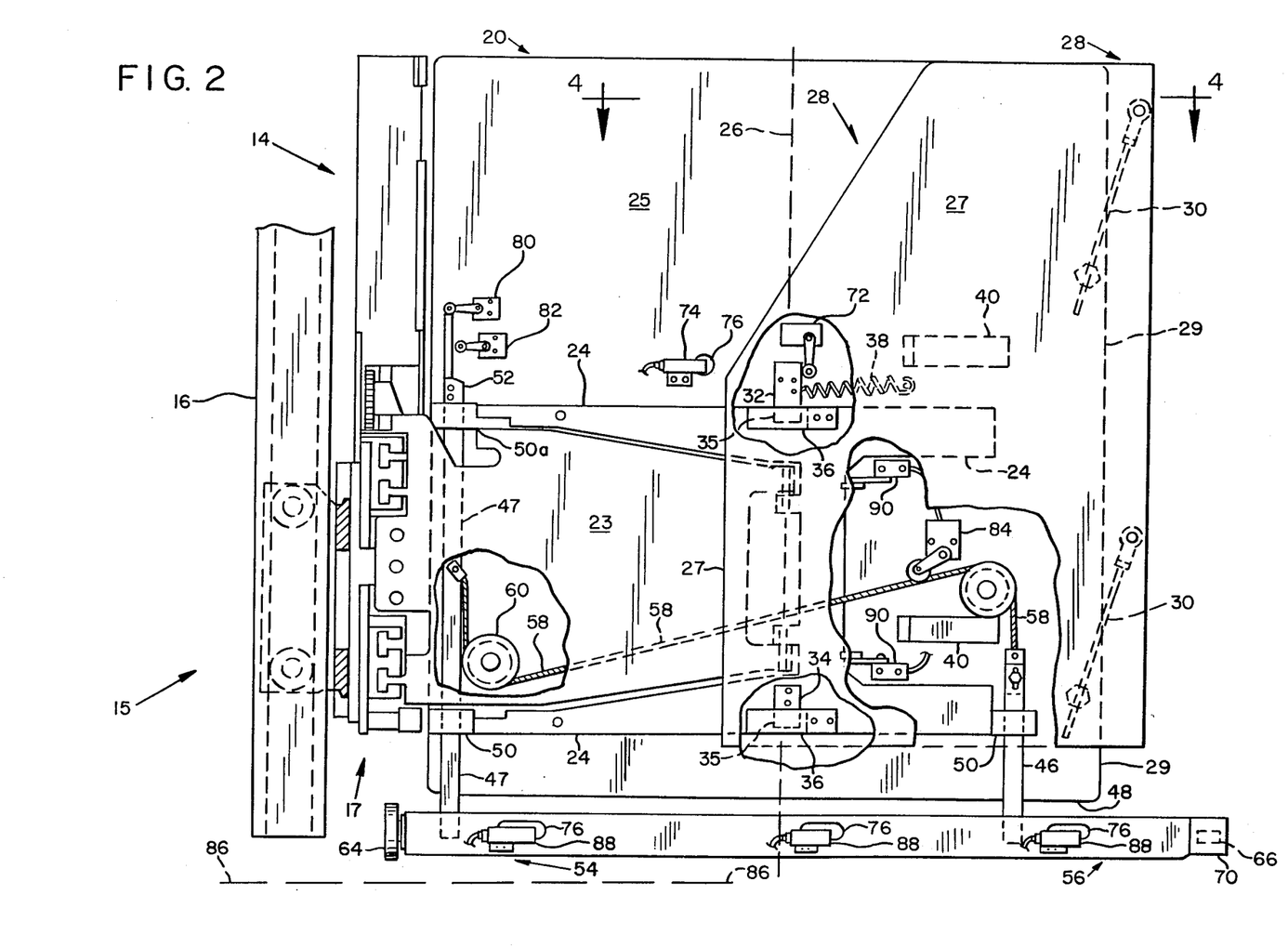
FIG. 2 is an enlarged side view of the load clamp of FIG. 1, with portions removed to show underlying structure.

Referring to FIGS. 1 and 2, each of the opposed clamp arm assemblies includes a contact pad 20 for engaging the load 22. The contact pads are supportably attached to the vehicle via the clamping mechanism and the lift system by respective opposed support arms 23 attached to the clamping mechanism. H-shaped pad mounting brackets 24 fastened to the outer face 25 of the respective contact pads are pivotally connected to the respective support arms to permit the contact pads to pivot about a central vertical axis 26 with respect to their support arms.

The clamp arms assemblies also include respective outer arm assemblies 28 which are movably supported on the respective contact pads. As may be seen in FIGS. 2 and 4, each outer arm assembly includes a shield plate 27 which substantially covers the forward outer face of the contact pad, including portions of the support arm 23 and pad mounting bracket 24, and extends forwardly of the forward edge 29 of the contact pad. The forward portion of the shield plate is supportably attached to the contact pad by a pair of bendable wands 30. The rear of the shield plate is supported by a pair of sliding blocks, an upper block 32 and a lower block 34, attached to the shield plate. The blocks slide on horizontally oriented tracks 36 which are attached to the contact pad mounting bracket 24 and are spaced outwardly therefrom so as to create a slot 37 between the tracks and the mounting bracket. The sliding blocks 32, 34 have downwardly projecting tongues 35 which extend downwardly into the slots between the tracks and the pad mounting bracket and prevent the shield plate from moving outwardly with respect to the contact pad while permitting it to move rearwardly with respect thereto. The bendable wands cooperate with the sliding blocks and tracks to permit the shield plate to move yieldably rearward with respect to its respective contact pad in response to force applied to the front edge of the shield plate. Although coil spring 38 may extend between the upper block 32 and the contact pad, such spring may be unnecessary if the bendable wands create sufficient force to urge the shield plate forwardly with respect to the contact pad.

Figure 4:
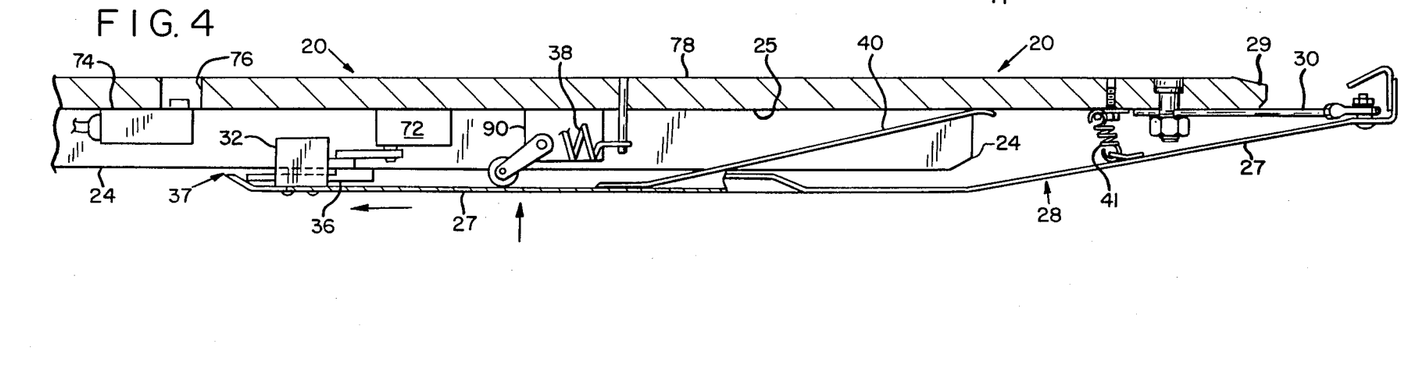
FIG. 4 is a partial sectional view of a clamp arm taken along line 4—4 of FIG. 2.

Referring still to FIGS. 2 and 4, it will be seen that the shield plate, in addition to being rearwardly movable with respect to the contact pad, is also inwardly movable with respect to the contact pad. A pair of upper and lower leaf springs 40 may be employed between the shield plate and the contact pad to urge the shield plate outwardly from the contact pad. A second coil spring 41 shown in FIG. 4 may also be used to oppose the leaf springs. Alternatively, these springs could be eliminated, with reliance totally on the resilience of the shield plate itself to provide the spring functions. Thus, the shield plate moves inwardly toward the outer face of the contact pad in response to a force applied to the outer surface of the shield plate.

As shown in FIGS. 1, 2, and 3, each clamp arm also includes a sag bar 42 suspended below the contact pad and oriented substantially parallel to the bottom edge 48 thereof. Each sag bar is suspended from its respective contact pad by a front rod 46 and a rear rod 47 which are fixed to the sag bar and vertically movable with respect to the contact pad. The rods are slidably mounted to the outer face 25 of each contact pad by sleeves 50, and pivotally attached to the inside surface of each sag bar by pins 51 (FIG. 3), so that the sag bar may move upwardly with respect to the contact pad to a vertically overlapping position adjacent thereto with the bottom of the sag bar substantially level with the bottom edge 48 of the contact pad. The rear rod 47 also extends through an upper sleeve 50a and includes a stop 52 fastened to the upper portion of the rod above the upper sleeve 50a. When the clamp arm assembly is sufficiently raised above the floor, this stop engages the upper sleeve in a manner shown in FIG. 2, preventing the rear rod from further downward movement with respect to the contact pad, and providing vertical support for the rear portion 54 of the sag bar. Vertical support for the front portion 56 of the sag bar is provided by a cable or chain tension member 58 extending between the top of the front rod and the mid section of the rear rod, the tension member being trained over a front pulley 62 and under a rear pulley 60. Both pulleys are attached to the contact pad and are freely rotatable. The weight of the front portion 56 of the sag bar acts on the tension member through the front rod to tension it.

The rear of each sag bar includes a rotatable wheel 64 mounted thereon transversely to the load-engaging, forward direction of the clamp arm assemblies. When each clamp arm assembly, including the contact pad, is lowered toward the floor, the wheel contacts the floor and lifts the rear of the sag bar upwardly with respect to the contact pad, while the tension member 58 correspondingly lifts the front of the sag bar. The wheel thus prevents the remainder of the sag bar from touching the floor under normal circumstances, and facilitates the transverse opening and closing of the clamp arms while the wheel is in contact with the floor.

The Sensors

The load clamp of the present invention includes a variety of sensors for sensing the load, and objects and surfaces in the vicinity of the load. In the preferred embodiment, the various sensors provide input signals to a conventional vehicle controller, including a data processing unit, which is contained in the driverless, automatically-guided vehicle and in communication with a conventional central computer. The processing unit of the driverless vehicle is programmed, in a manner described hereafter, to use the signals provided by the various sensors, combine them with other information provided to the vehicle controller, and issue commands to the vehicle drive system, the clamping system, and the lift system.

Figure 5:
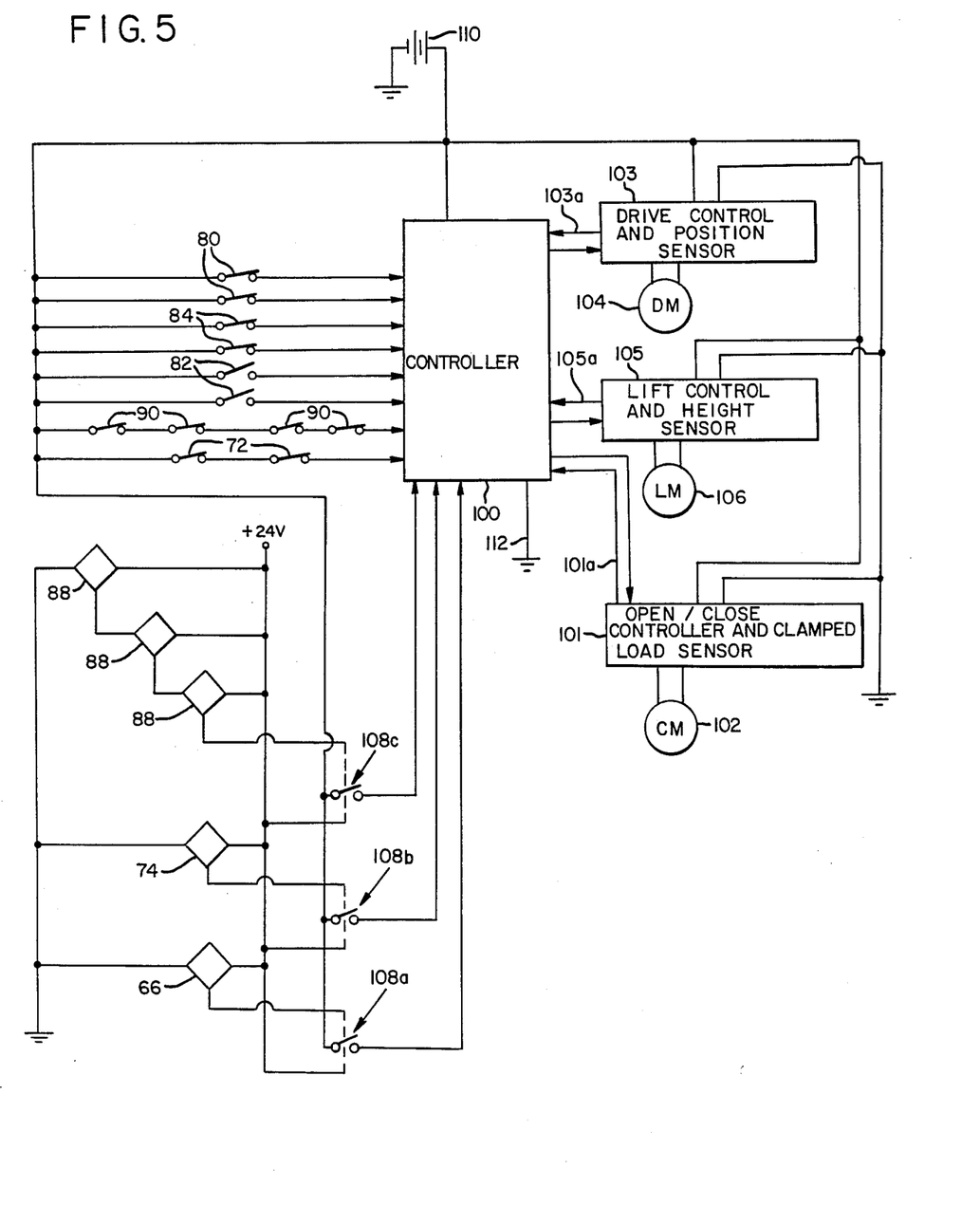
FIG. 5 is a schematic diagram of exemplary circuitry linking the various clamp sensors through a controller to the various power mechanisms of the automatically-guided vehicle.

FIG. 5 is a schematic diagram showing the relationship of the various sensors of the present invention to the controller 100 and to the vehicle systems. The vehicle systems include the clamp control 101 which controls the clamping motor 102 and includes a clamping force transducer of any convenient type for detecting whether or not a load is clamped; a drive control 103 which controls the forward, reverse and stop modes of a drive motor 104 and senses the position of the vehicle and clamp along its path of travel through a conventional fifth wheel encoder or other appropriate sensor; and a lift control 105 which controls the lifting and lowering modes of a mast lift motor 106 and senses clamp height by a lift chain sprocket encoder or other conventional means.

Sensors for Regulating the Forward Approach of the Clamp

Various sensors are provided whose purpose is to regulate the clamp arms' forward approach to the load. Some of these sensors may also function as sensors for indicating obstructions.

As explained above, the driverless vehicle is typically guided about the floor to a predetermined location where it is to pick up or deposit a load. However, as the vehicle approaches the predetermined location, the load clamp sensors of the present invention precisely position the clamp arms with respect to a load to be picked up, and otherwise detect obstacles which could prevent the engagement or deposit of a load.

Forward Approach Photosensor

Foremost among these forward approach sensors is a forward approach photosensor 66 mounted in the forward extremity of one of the sag bars in front of the forward edges 29 of the clamp pads. As may be understood with reference to FIGS. 1, 2 and 3, the forward approach photosensor includes a light source positioned so as to project a light beam 65 to a reflector plate 68 mounted in the forward extremity of the opposing sag bar. The photosensor is preferably of a conventional retro-reflective type, including a photoelectric device for detecting the reflection of the beam as it is reflected from the reflector plate mounted on the opposite sag bar. However it should be understood that other types of photoelectric devices, and even other types of sensors, could be used and are within the scope of the invention.

As shown in FIG. 3, the photosensor 66 is mounted in a resilient bumper 70 on the front of the sag bar. The bumper, including the photosensor, is adpated to move rearwardly in response to contact with a load or obstacle, yet resume its extended position shown in FIG. 3 when removed from contact with the obstacle under the urging of a bumper spring 71. As may be seen in FIG. 1, the reflector plate 68 on the opposite sag bar is similarly mounted to a resilient bumper 70 on the front of the opposite sag bar.

With reference to FIG. 5, if the forward approach photosensor beam is unbroken by a load or obstacle, the photosensor 66 will detect its own beam which has been reflected from the reflector plate 68 on the opposite sag bar, and in response provide current which closes a normally-open relay switch 108a, providing a signal to the controller. Conversely, if the beam of the forward approach photosensor is broken by a load or obstacle, no current is provided to the relay 108a, permitting the normally-open relay to open and interrupt the signal to the controller, thereby informing the controller that a load or obstacle is between the clamp arms and a predetermined distance in front of the forward edges of the contact pads. Once the beam clears the load or obstacle, the signal to the controller is reestablished without the need to reset the sensor or relay.

The normally-open relay switch also provides a safety feature. If the forward approach photosensor malfunctions, or a wire associated with the photosensor is broken, the signal to the controller will be interrupted by the open-circuit condition as though an object were sensed, and the controller can bring the vehicle to a stop. A similar safety feature is incorporated into most of the other sensor circuits described herein, that is, the sensors indicate the presence of objects by means of an open circuit so that a circuit malfunction is interpreted as the sensing of an object.

The vehicle controller 100 is programmed with information relating to the normal horizontal distance between the forward approach photosensor 66 and the forward edges 29 of the contact pads, and is also supplied with information relating to the dimension of the load between its rearward and forward surfaces. Accordingly, as the vehicle approaches a load to be picked up, the rear surface of the load closest to the vehicle will break the beam 65 enabling the vehicle controller to determine how much further the vehicle should advance in order to position the front edges 29 of the contact pads approximately two inches rearwardly of the forward surface of the load. The controller 100 then commands the vehicle drive system, through the drive control 103, to move the vehicle and clamp forward a predetermined distance and stop.

The forward approach photosensor can also act as an obstacle sensor. Through a feedback link 101a from the clamping control 101, the vehicle controller knows whether or not a load is clamped in the clamp arms. Even if the vehicle has clamped a load, the sensor 66 is still forward of the load's forward surface. Accordingly, the forward approach photosensor 66 will know that any object sensed while the clamp is more than a predetermined distance from a known load deposit location must be an obstacle, and will warn the controller causing it to command the drive control 103 to stop the vehicle. Clamp location is sensed by the controller through another feedback link 103a (FIG. 5) from the position sensor of the drive control 103. Alternatively, if no load is clamped, and an object is sensed while the clamp is more than a predetermined distance from a known load location the forward approach sensor likewise signals the presence of an obstacle and the controller interrupts the forward progress of the vehicle through the drive control 103.

Figure 6:
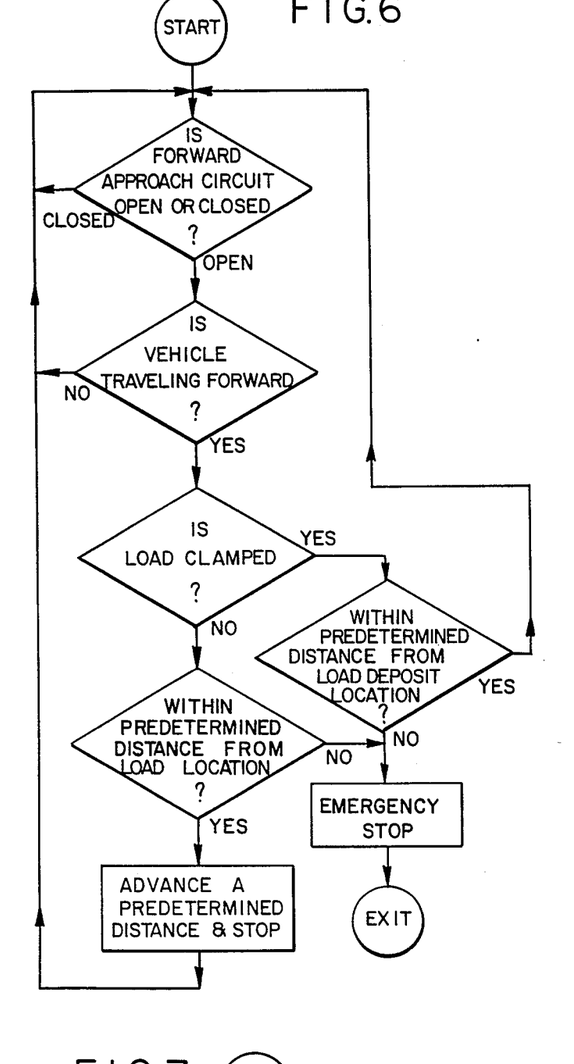
FIGS. 6–11 are exemplary logic flow diagrams according to which the controller of FIG. 5 may be programmed.

FIG. 6 illustrates the operating logic of the controller 100 relating to the forward approach photosensor 66, in accordance with the above description. The sensing of whether or not the vehicle is travelling forward (through the link 103a) eliminates meaningless sensor readings during retraction of the clamp arms. The emergency stop command disables the drive motor 104 and lift motor 106, through the drive control 103 and lift control 105, while maintaining the clamp arms in their existing condition (either open or clamped).

Arm Tip Switches

In addition to the forward approach photosensor 66 described above, the preferred embodiment of the load clamp includes several forward contact sensors. A conventional forward bump sensor is included in each of the yieldable bumpers 70 on the front of the sag bars. These bump sensors comprise proximity limit switches such as 70a (FIG. 3) which signal the controller to bring the vehicle to an emergency stop upon contact with an obstacle.

In addition, the outer arm assemblies 28 of the clamp arm assemblies each include an arm tip sensor for sensing obstacles forwardly aligned with the clamp pads 20. Turning to FIGS. 2 and 4, each shield plate 27 is mounted to its respective contact pad so as to protrude forwardly therefrom, and also forwardly of any clamped load. Each shield plate is resiliently movable rearwardly with respect to the pad, and each of the contact pads of the load clamp has a limit switch 72 fastened thereto. The actuating arm of the spring-biased limit switch bears against the forward edge of the upper slide block 32 and is biased to spring open if the slide block moves rearwardly. For example, if the load clamp is moving forwardly in an attempt to engage or deposit a load, proximate other loads, and the shield plate forwardly of the contact pad engages an obstacle, the bendable wands supporting the front portion of the shield plate will deflect, permitting the shield plate to slide rearwardly on the tracks 36 with respect to the contact pad. Rearward movement of the upper block 32, which is attached to the shield plate, will permit the biased limit switch 72 to open, informing the vehicle controller that the arm tip has encountered a transversely offset load or other obstacle. In response to such a signal, the controller will order an emergency stop, disabling the drive system and the lift system while maintaining the clamp arms in their existing condition. When the obstacle is removed, the shiled plate resumes its extended forward position, the upper block sliding forward to close the switch 72. This will permit the vehicle to operate again.

Of course, alternative embodiments other than the exemplary mechanical arm tip sensor described above may be used. For example, a conventional resilient tape switch could be mounted on the forward edge of the shield plate.

Figure 7:
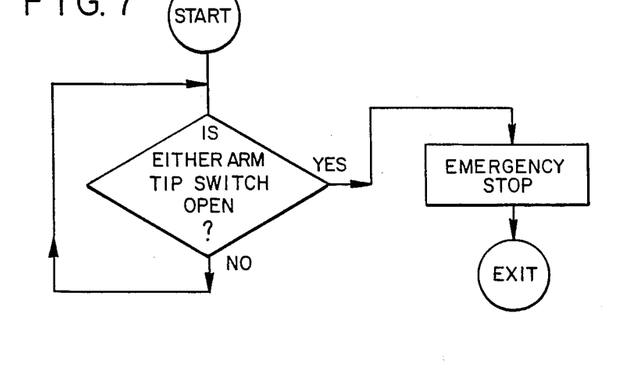

Referring to the circuit diagram of FIG. 5 and the logic flow diagram of FIG. 7 for the arm tip sensors, since the two limit switches 72 for the arm tip sensors are arranged in series, opening either switch as a result of the shield plate contacting an obstacle will interrupt the signal from the arm tip sensor circuit to the controller and bring the vehicle to an emergency stop.

Sensors for Regulating the Vertical Approach of the Clamp

The load clamp of the present invention also includes a variety of sensors for regulating the vertical approach of the load clamp. Such sensors include a load height sensor for regulating the approach to loads which are stacked upon other loads, sensors for regulating the approach to floor-supported loads, vertical obstacle sensors, load sag sensors, and sensors for detecting the absence of a supporting surface upon which to deposit a load.

Load Height Photosensor

Referring to FIG. 2, a load height photosensor 74 is positioned on the outer face 25 of the contact pad a predetermined distance above the lower edge 48 of the contact pad. An aperture 76 is formed in the contact pad to enable a light beam generated by the photosensor to project transversely between the contact pads to a reflector plate (not shown), which is mounted in alignment with the load height photosensor on the inner face 78 of the opposing contact pad. Like the forward approach photosensor, this photosensor is of the retro-reflective type and is capable of generating a beam and receiving the reflected beam. However, as previously mentioned, other types of photoelectric devices as well as other types of sensor devices could be used.

In operation, the load height photosensor is used primarily for engaging stacked loads, i.e. when clamping a load which is on top of one or more other loads. In such an application, the driverless vehicle approaches a load location with the clamp arms open and raised high on the mast 16, advancing the vehicle until the forward approach photosensor 66 detects the rear surface of the load and the controller 100 directs the vehicle to move forward a predetermined distance and stop. Next, the controller causes the lift motor 106 to lower the load clamp toward the load. As before, the processor of the vehicle controller 100 known the relevant dimensions of the load clamp and the load, including the vertical distance between the load height photosensor 74 and the bottom edges 48 of the contact pads, and the height of the load to be clamped. Therefore, as will be understood with reference to the circuit diagram of FIG. 5, when the top of the load intercepts the beam generated by the load height photosensor 74, current to the normally open relay 108b is interrupted, thereby interrupting the corresponding signal to the controller 100. Thereafter, the vehicle controller causes the lift motor 106 to lower the clamp arms a predetermined distance until the bottom edges 48 of the contact pads are approximately one inch above the bottom of the load, at which point the lowering is stopped.

Figure 8:
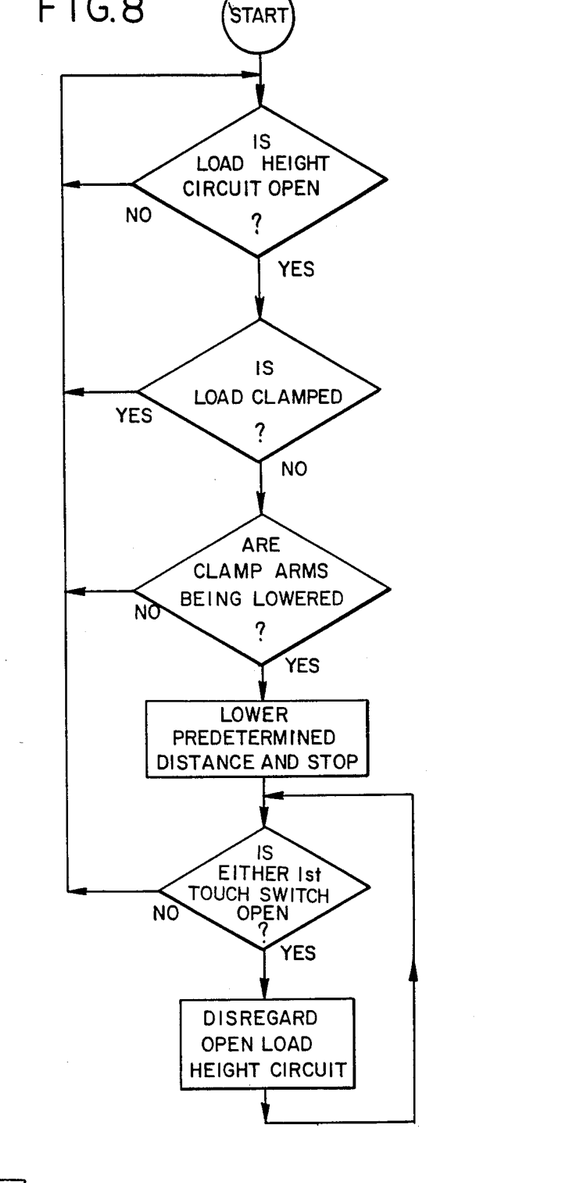

The operating logic associated with the load height sensor is shown in FIG. 8. If the load height circuit opens, indicating that an object has broken the beam of the load height photosensor 74, the controller initially determines whether or not a load is clamped through feedback link 101a. If a load is clamped, the controller ignores the open load height circuit. If a load is not clamped, the controller next determines whether the load clamp is being lowered by the lift motor through a feedback link 105a with the lift control 105. If the load clamp is not being lowered, the controller likewise ignores the open load height circuit. For example, when the load clamp has deposted a load, opened its clamp arms and is in the process of raising, or about to raise, the load clamp, the controller will disregard an open load height circuit.

If the load clamp is being lowered, the controller will cause the load clamp to be lowered a predetermined distance and stop, preparatory to clamping the load. However, the controller continues to determine whether the load clamp is approaching an elevated or floor-supported load by checking to see if either of the floor-engagement first touch switches (which will be explained below) is open. The load height sensor is only for application with elevated stacked loads; therefore if either sag bar of the load clamp has touched the warehouse floor, the controller will realize that this is not a stacked load and disregard the open load height circuit.

First Touch Switches

Figure 9:
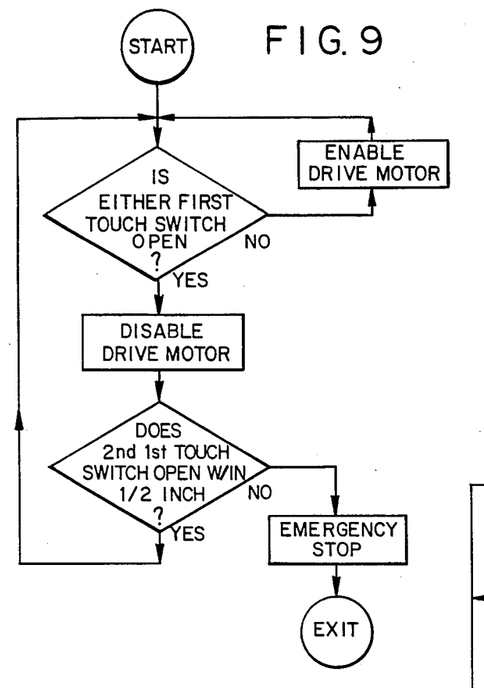

When handling floor-supported loads, it is important that the vehicle controller be aware of the relationship of the load clamp to the floor. There are three sensors associated with each sag bar 42 and contact pad which perform this function. The first of these sensors is a first touch limit switch 80. Referring to FIG. 2, the sag bar associated with each clamp arm is suspended a predetermined distance below the respective contact pad of that clamp arm. As the clamp arms are lowered toward the floor the sag bar wheel 64 will be the first portion of the clamp arm assembly to touch the floor. Each first touch switch is mounted on the outer face 25 of the contact pad 20 with the actuating arm of the switch resting on top of the rear rod 47. The first touch switch is spring biased toward a closed position and will normally be closed unless the sag bar is in contact with the floor or other obstacle. As the sag bar contacts the floor or other obstacle, the sag bar moves upwardly with respect to the contact pad, the rear rod 47 also moving upwardly and pushing the first touch switch 80 open. With reference to FIGS. 5 and 9, if the first touch switches associated with both clamp arms open substantially simultaneously, the controller 100 will disable the drive motor through drive control 103, preventing the vehicle from forward or backward motion, but will permit operation of the mast motor and clamping motor. If the two first touch switches 80 do not open substantially simultaneously, however, the vehicle controller interprets this condition as detecting an obstacle on the warehouse floor or the absence of a transversely level condition, and declares an emergency stop as explained above with respect to other sensors.

When the clamp arms are raised off the floor, the weight of the sag bar will cause the rear rod 47 to slide downwardly in its sleeves 50 and 50a until the stop 52 contacts the upper sleeve 50a. Simultaneously, the spring-biased first touch switch will cause the switch to again resume a closed position. It should be noted that although the primary function of the first touch switches are to sense the foor, they will also detect and respond to an obstacle, considerably above the floor, which is encountered when the clamp is being lowered relative to a load.

Full Down Switches

If the first touch switches 80 associated with the respective clamp arms sense the floor substantially simultaneously, the vehicle controller will permit the lift system to continue lowering the load clamp. Further limit switches, i.e. the full down switches 82, are used to detect when each of the clamp arms has been lowered to the extent that the bottom edge 48 of the contact pad is one inch above the floor. Referring again to FIG. 2, the full down switch 82 is attached to the outer face of the contact pad beneath and slightly forward of the first touch switch 80 so that it does not contact the rear rod 47. The actuating arm of the switch is arranged a predetermined distance vertically above the stop 52 so that when the sag bar is retracted adjacent the clamp pad with the bottom of the sag bar wheel 64 one inch below the bottom edge 48 of the contact pad, the stop 52 will move upwardly and force the normally open spring-biased, full down limit switch 82 closed. It will be understood that the distance the full down switch is positioned above the stop 52 should be one inch less than the distance that the bottom edge of the sag bar wheel 64 depends below the bottom edge of the contact pad.

Figure 10:
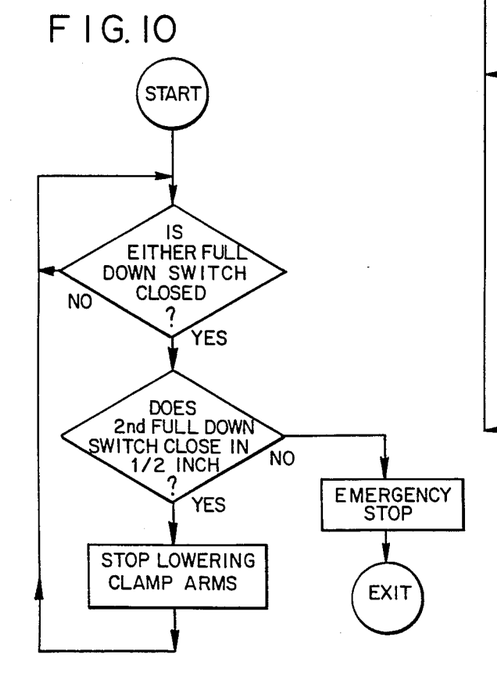

Operation of the full down switches will be further understood with reference to the circuit diagram of FIG. 5, and the logic flow diagram of FIG. 10. If the normally open full down limit switches 82 associated with the respective clamp arms are closed substantially simultaneously, the controller 100, acting through lift control 105, will prevent the mast motor from lowering the clamp arms any further. In this way the full down switches serve to vertically position the load clamp one inch above the bottom of the load. The first touch switch, which necessarily has to be opened before the full down switch can be closed, has already prevented the vehicle from moving forward or backward. Accordingly, the only function that the vehicle can perform when both full down switches have been closed is that of clamping or unclamping a load. However if the full down switches associated with both clamp arms do not close substantially simultaneously, the vehicle controller will read this condition as an obstacle beneath one of the clamp arms, on the lack of a transversely level floor condition, and declare an emergency stop.

Bar Tilt Switches

The load clamp of the present invention contains an additional sensor system to regulate the vertical approach to the load, that sensor being specifically adapted to sense the lack of a level floor condition in the forward direction, or obstacles under the forward positions of the sag bars. Referring still to FIG. 2, as the lift motor lowers the load clamp toward the floor 86, the sag bar will contact the floor and then move upwardly relative to the contact pad as the contact pad continues moving toward the floor. If the floor is level in the forward, or load-engaging, direction and there are no obstacles, the sag bar will remain relatively horizontal and parallel to the floor 86 and the bottom edge 48 of the contact pad. However, a raised floor section or an obstacle beneath the forward portion 56 of the sag bar will cause the forward portion of the sag bar to move upwardly with respect to the contact pad a relatively greater distance than the rear portion 54 of the sag bar. This uneven relative movement of the sag bar with respect to the contact pad would cause corresponding uneven upward relative movement of the front and rear rods 46 and 47. Recalling that the tension member 58 acts to suspend, or provide vertical support for, the front portion of the sag bar when the sag bar is in a substantially level, or horizontal, position, an obstacle underneath the front portion of the sag bar will cause the tension member 58 to acquire slack. A bar tilt limit switch 84 is attached to the contact pad with its actuator arm bearing against the taut tension member 58. The switch is spring biased toward an open position but is held closed, as shown in FIG. 2, by the pressure of the tension member upon the actuating arm. The controller will declare an emergency stop if either of the bar tilt switches opens. Of course, the bar tilt switches could also cause an emergency stop if the front portion of sag bar encounters an obstacle when the load clamp is being lowered to approach a stacked load. Raising the clamp arms or removing the obstacle will allow the front portion of the sag bar to hang down, tensioning the member 58 and reclosing the circuit associated with the bar tilt switch 84.

Referring to the circuit diagram in FIG. 5, there are two bar tilt circuits in parallel, each bar tilt circuit including a bar tilt limit switch 84 for each clamp arm. The operating logic associated with the bar tilt switches is substantially similar to the operating logic for the arm tip switches shown in FIG. 7. If either bar tilt switch opens, the controller declares an emergency stop.

Sag and Vertical Approach Photosensors

The load clamp of the preferred embodiment also includes sensors for detecting sagging of the load. Referring to FIGS. 2 and 3, one of the sag bars 42 includes three sag photosensors 88, which are attached to the sag bar proximate three apertures 76 extending through the sag bar transversely to the direction of travel of the vehicle (there could be more or less of these sensors). Like the photosensors described above, these sag photosensors are of the retroreflective type which generate a beam of light and receive the reflected beam. As may be partially seen in FIG. 1, the opposite sag bar has three reflectors 68 mounted on the inside surface of the sag bar and aligned with the three sag photosensors. The sag photosensors will detect sagging of the load by interruption of any of the beams when a load is clamped and elevated above a supporting surface. It should also be noted that the sag photosensors are capable of detecting obstacles beneath and between the clamp arms as the load clamp is being lowered, and also whether or not an elevated supporting surface is available to stack a load upon.

Figure 11:
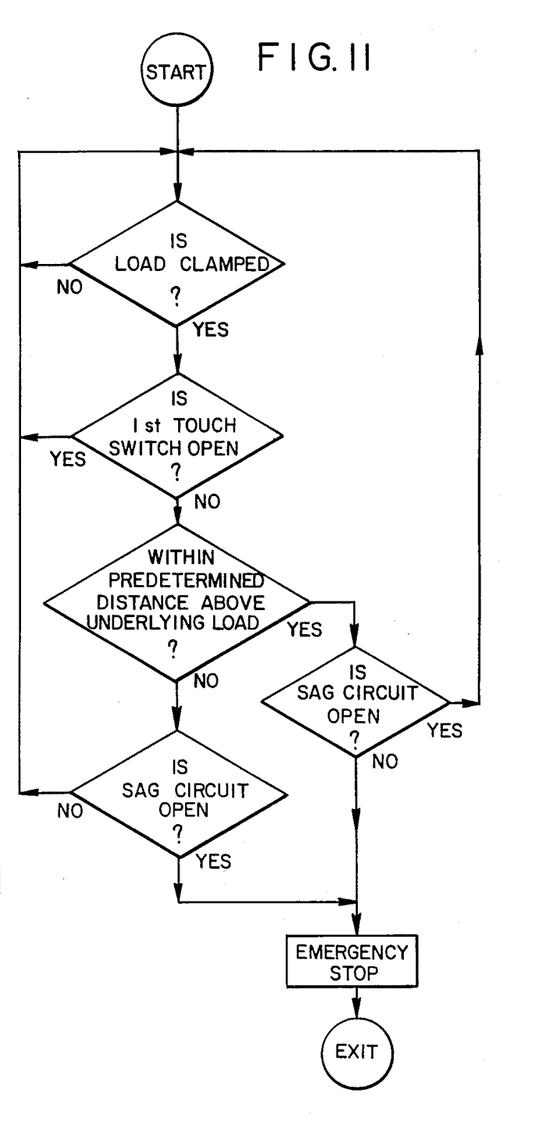

Operation of the sag photosensors will be further understood with reference to the circuit diagram of FIG. 5, and the logic flow diagram of FIG. 11. Referring first to FIG. 5, it will be seen that the three sag photosensors 88 are connected in series across a 24-volt DC power source. When none of the sag sensors detects an object beneath and between the clamp arms, the sag circuit is closed, providing current to hold a normally open relay 108c closed. With the relay closed, the controller 100 receives a signal through the relay. However, when the beam of any one of the three sag photosensors is broken, the current to the relay will be interrupted by an open sag circuit, allowing the relay to open and interrupting the signal to the controller.

Referring to the logic flow diagram of FIG. 11, the controller initially determines whether a load is clamped in the clamp arms. If no load is clamped, the vehicle proceeds with its normal operation since the sensing of objects by the sag sensors will not be indicative of any abnormal condition, i.e. the beams of the three sag photosensors will normally be broken often when the vehicle is in the process of approaching, engaging or depositing a load with its clamp arms open. Thereafter, the controller determines whether either first touch switch is open. If so, the sag sensors are likewise ignored because proximity of a clamped load to the floor is indicated and the sensing of the load by the sag sensors would be normal.

If a load is clamped in the clamp arms and neither first touch switch is open, the controller then determines whether the load clamp is within a predetermined distance above a known underlying load or other elevated supporting surface. If the clamped load is not within a predetermined distance above an underlying elevated supporting surface, and the sag circuit is open, the controller will read this condition as a sagging load and declare an emergency stop. This condition could also mean that there is an obstacle beneath and between the clamp arms where no obstacle should be. An emergency stop is also the appropriate response for this condition.

If the load clamp is within a predetermined distance above a known underlying load or other elevated supporting surface, the controller expects the sag circuit to be opened by the underlying load or supporting surface upon which the clamped load is to be deposited. If the sag circuit does not open under such circumstances, the controller interprets this condition as meaning that the expected load-supporting surface is not present to deposit the load upon, and declares an emergency stop, primarily to prevent the clamp arms from releasing the load.

Outside Obstacle Sensors

The load clamp also includes outside obstacle sensors associated with each clamp arm to detect obstacles transversely adjacent to the load clamp. Referring to FIG. 2, the outside obstacle sensors associated with each clamp arm include a pair of outside arm limit switches 90 attached to the outer face of the contact pad, between the shield plate 27 and the contact pad 35 with their actuating arms adjacent to the shield plate. The outside arm switches are spring-biased toward a closed position as shown in FIG. 4 with the actuating arm touching or closely adjacent to the shield plate.

It will be recalled that the shield plate is biased transversely outward from the contact pad. If the shield plate of the outside arm assembly encounters an outside obstacle, either when the vehicle is opening the clamp arms or when the vehicle is maneuvering, the shield plate deflects inwardly, pushing one or both of the outside arm switches 90 of the clamp arm to an open position and causing the controller to declare an emergency stop. When the obstacle is removed, the shield plate resumes its spaced relationship with the contact pad as shown in FIG. 4 and the biased outside arm switches will be allowed to return to their closed positions.

Referring to FIG. 5, it will be seen that four outside arm limit switches 90 are arranged in series. Should any one of these switches open, the signal through the outside arm circuit to the controller will be interrupted and the controller will declare an emergency stop. The operating logic for the outside arm switches is similar to the logic flow diagram shown in FIG. 7 with respect to the arm tip switches.

Several examples may be helpful to understand the operation of the preferred embodiment of the vehicle and load clamp as it relates to the various sensors described above.

EXAMPLE NO. 1

The vehicle is traveling across the floor of a warehouse toward a load location where it is to pick up a load which is resting on the floor. The clamp arms are open. As the vehicle travels forward across the floor, interruption of the signals from the contact-type sensors including the arm tip sensors, the outside arm sensors, and the forward bump sensors will cause the controller to declare an emergency stop. Interruption of the signal from the forward approach photosensor, when the vehicle is not within a predetermined distance from the load location, will also cause the controller to declare an emergency stop. In an emergency stop the drive motor and lift motor are disabled while the clamp arms are maintained in their present condition, whether opened or clamped.

Upon an emergency stop, the main warehouse computer is notified by the controller 100 and a person is set to the vehicle location to remove the obstacle. Once the obstacle is removed, the various sensors can reset themselves, and the vehicle may proceed to the load location.

The vehicle approaches the load at the load location with the clamp arms opened and raised above the floor. If the load is in its proper location, the forward approach photosensor senses the rear surface of the load as the clamp arms advance on either side of the load, and the controller causes the vehicle to advance a predetermined distance and stop, with the forward edge of the contact pads approximately two inches rearwardly of the forward surface of the load.

If the load is out of its proper place at the load location, or another adjacent load is out of its proper place, contact by the load clamp with such misplaced loads will cause the controller to declare an emergency stop in response to interruption of the signals from the contact sensors such as arm tip sensors, outside arm sensors, or forward bump sensors.

Once the load clamp has been positioned in a forward direction relative to the load by the forward approach photosensor, the lift motor will begin to lower the open clamp arms on either side of the load. As the clamp arms are lowered toward the floor, the wheels 64 of the sag bars should touch the presumably level floor substantially simulanteously. Upon contact by either sag bar with the floor, the first touch switch associated with that sag bar and clamp arm will cause the controller to disable the drive motor 104. The lift motor will continue to lower the open clamp until the clamp pads are approximately one inch off the floor, with the sag bars retracted adjacent to their respective contact pads. If both contact pads reach the full down position substantially simultaneously, the full down switches will cause the controller to stop the lift motor from lowering the load clamp.

As the load clamp is being lowered, if both first touch switches do not open within one-half inch of vertical travel of each other, or if both full down switches do not close within one-half inch of vertical travel of each other, the controller will interpret such conditions as an obtacle beneath one of the clamp arms, or the absence of a transversely level floor condition, and declare an emergency stop. Similarly, if either bar tilt switch opens, the controller will detect an obstacle, or the absence of a forwardly level floor condition, and declare an emergency stop. Assuming no obstacle or lack of level condition has been encountered, the load clamp may clamp the load and begin to raise the load. Once both sag bars have been lifted above the floor, the drive motor is enabled by the closure of the first touch switches 80, and the vehicle controller begins to monitor the sag photosensor circuit to see if any portion of the load has slipped down between the sag bars.

As the vehicle travels across the warehouse floor with a clamped load, its operation is substantially as described above except that interruption of the signal from the sag circuit will cause the controller to declare an emergency stop. When the vehicle approaches the location where it is to deposit the load, the forward approach photosensor determines whether there is already a load or other obstacle in the intended load deposit location. Interruption of the signal from the forward approach photosensor when the vehicle is not within a predetermined distance from the load deposit location indicates an obstacle and causes an emergency stop when a load is clamped and the vehicle is traveling forward. Also, if the sag sensors 88 detect an object prematurely during lowering, i.e. prior to the opening of a first touch switch, an emergency stop is declared. The first touch, full down and bar tilt sensors will operate substantially and described above when depositing a load.

EXAMPLE NO. 2

If the vehicle is to pick up a stacked load, that is, an elevated load which is on top of one or more other loads, the forward approach to the load will be much the same as described above except that the load clamp will be carried much higher on the mast. Of course, the vehicle knows the load location and at what height it should find the stacked load.

As the clamp arms are lowered on either side of the stacked load, the top of the stacked load will interrupt the beam of the load height photosensor 74. The lift motor will then lower the load clamp a predetermined distance and stop, placing the bottom edge of the contact pads approximately one inch above the bottom of the load. The load may then be clamped by the clamp arms. It should be noted that if the sag bars encounter an obstacle as the load clamp is being lowered about a stacked load, the contact-type sensors would function as described in Example No. 1 above and the controller would declare an emergency stop.

When depositing the load in an elevated position upon another load at a known load deposit location, the sag sensors should sense the supporting load beneath the clamped load as the clamped load is being lowered. If an obstacle is sensed, or if no supporting surface is sensed by the sag sensors where such surface is expected to be found, the controller will cause an emergency stop.

The terms and expressions which have been employed in the foregoing specification are used therein as terms of description and not of limitation, and there is no intention in the use of such terms and expressions of excluding equivalents of the features shown and described or portions thereof, it be recognized that the scope of the invention is defined and limited only by the claims which follow.

What is claimed is:

1. In a driverless vehicle for handling a load having a rearwardly-facing surface proximate said vehicle and a forwardly-facing surface remote from said vehicle, said vehicle including drive means for selectively moving at least a portion of said vehicle in a load-engaging direction or stopping said portion of said vehicle, a load clamp comprising:

(a) a pair of transversely openable and closeable arms extending forwardly from said portion of said vehicle in said direction and mounted on said portion of said vehicle so as to move in unison therewith in said direction;

(b) said arms including respective clamp pad means for selectively releasably engaging said load, said clamp pad means having a forward extremity;

(c) forward sensor means for sensing said rearwardly-facing surface of said load as said portion of said vehicle approaches said rearwardly-facing surface along said direction; and (d) control means responsive to said forward sensor means for causing said drive means to move said portion of said vehicle forwardly in said direction a predetermined distance after said forward sensor means senses said rearwardly-facing surface of said load and to stop the forward movement of said portion of said vehicle independently of any sensing of any forwardly-facing surface of said load before said forward extremity of said clamp pad means extends forwardly of said forwardly-facing surface of said load.

2. The load clamp of claim 1 wherein said arms are mounted for vertical reciprocation relative to said vehicle and said forward sensor means is mounted on at least one of said arms so as to reciprocate vertically in unison therewith.

3. In a driverless vehicle for handling a load at a predetermined location, said vehicle including drive means for selectively moving at least a portion of said vehicle in a load-engaging direction or stopping said portion of said vehicle, a load clamp comprising:

(a) a pair of transversely openable and closeable arms extending forwardly from said portion of said vehicle in said direction and mounted on said portion of said vehicle so as to move in unison therewith in said direction;

(b) said arms including clamp pad means for selectively releaseably engaging said load;

(c) forward sensor means for sensing the presence of an object forwardly of and transversely between said clamp pad means;

(d) position sensor means for sensing whether said portion of said vehicle is within a predetermined distance from said predetermined location; and (e) control means responsive to said forward sensor means and to said position sensor means for preventing said drive means from moving said portion of said vehicle forwardly in said direction in response to the sensing by said forward sensor means of the presence of an object when said portion of said vehicle is not within said predetermined distance from said predetermined location.

4. The load clamp of claim 3 wherein said forward sensor means includes an electro-optical sensor.

5. The load clamp of claim 4 wherein said electro-optical sensor includes means for transmitting light in a direction substantially transverse to said direction of travel.

6. The load clamp of claim 3 wherein said arms are mounted for vertical reciprocation relative to said vehicle, and said forward sensor means is mounted on at least one of said arms so as to reciprocate vertically in unison therewith.

7. In a driverless vehicle having drive means for selectively moving at least a portion of said vehicle in a load-engaging direction or stopping said portion of said vehicle, a load clamp comprising:

(a) a pair of transversely openable and closeable arms extending forwardly from said portion of said vehicle in said direction and mounted on said portion of said vehicle so as to move in unison therewith in said direction;
(b) said arms including respective clamp pad means for selectively releaseably engaging a load;
(c) said arms including respective forward sensor means mounted thereon, transversely movable relative to each other in unison with said arms, for sensing the presence of an object forwardly of, and transversely outside the area between, said clamp pad means; and
(d) control means responsive to said forward sensor means for preventing said drive means from moving said portion of said vehicle forwardly in said direction in response to the sensing by said sensor means of the presence of an object.

8. The load clamp of claim 7 wherein said respective forward sensor means include respective means movably supported on said respective arms for moving rearwardly with respect to said clamp pad means in response to contact with an object.

9. In a driverless vehicle for handling a load having a bottom surface and a top surface, a load clamp comprising:
(a) a pair of transversely openable and closeable arms extending forwardly from said vehicle in a load-engaging direction;
(b) said arms including respective clamp pad means for selectively releaseably engaging said load;
(c) lift means on said vehicle for selectively raising and lowering said arms with respect to said vehicle;
(d) at least one of said arms including load sensor means for sensing said top surface of said load as said arms are lowered toward said load; and
(e) control means responsive to said load sensor means for causing said lift means to lower said arms a predetermined distance after said load sensor means senses said top surface of said load.

10. The load clamp of claim 9 wherein said load sensor means includes an electro-optical sensor.

11. The load clamp of claim 10 wherein said electro-optical sensor includes means for transmitting light between said arms in a direction substantially transverse to said load-engaging direction.

12. In a driverless vehicle for handling a load, a load clamp comprising:
(a) a pair of transversely openable and closeable arms extending forwardly from said vehicle in a load-engaging direction;
(b) said arms including respective clamp pad means for selectively releaseably engaging said load;
(c) lift means on said vehicle for selectively vertically moving said arms and said clamp pad means with respect to said vehicle;
(d) clamping sensor means for sensing whether said clamp pad means are engaging a load;
(e) vertical position sensor means for sensing whether said clamp pad means are within a predetermined distance above a predetermined supporting surface;
(f) at least one of said arms including bottom sensor means for sensing the presence or absence of an object beneath and transversely between said clamp pad means;
(g) control means responsive to said clamping sensor means, said vertical position sensor means and said bottom sensor means for preventing said lift means from vertically moving said arms with respect to said vehicle in response to the sensing by said bottom sensor means of the presence of an object when said clamp pad means are engaging a load and are not within said predetermined distance above said supporting surface.

13. The load clamp of claim 12 wherein said bottom sensor means includes an electro-optical sensor.

14. The load clamp of claim 13 wherein said electro-optical sensor includes means for transmitting light between said arms in a direction substantially transverse to said load-engaging direction.

15. The load clamp of claim 12 including a plurality of said bottom sensor means all located substantially said predetermined distance beneath said bottom edge of said clamp pad means.

16. In a driverless vehicle for handling a load, a load clamp comprising:
(a) a pair of transversely openable and closeable arms extending forwardly from said vehicle in a load-engaging direction;
(b) said arms including respective clamp pad means for selectively releasably engaging said load;
(c) lift means on said vehicle for selectively vertically moving said arms and said clamp pad means with respect to said vehicle;
(d) power means on said vehicle for selectively opening and closing said arms and said clamp pad means;
(e) clamping sensor means for sensing whether said clamp pad means are engaging a load;
(f) vertical position sensor means for sensing whether said clamp pad means are within a predetermined distance above a predetermined supporting surface;
(g) at least one of said arms including bottom sensor means for sensing the presence or absence of an object beneath and transversely between said clamp pad means;
(h) control means responsive to said clamping sensor means, said vertical position sensor means and said bottom sensor means for preventing said power means from opening said arms and clamp pad means in response to the sensing by said bottom sensor means of the absence of an object when said clamp pad means are engaging a load and are within said predetermined distance above said predetermined supporting surface.

17. In a driverless vehicle, a load clap comprising:
(a) a pair of tranversely openable and closeable arms extending forwardly from said vehicle in a load-engaging direction;
(b) said arms including respective clamp pad means for selectively releaseably engaging a load, said clamp pad means being substantially horizontally opposed to each other;
(c) lift means on said vehicle for selectively raising and lowering said arms and said clamp pad means vertically with respect to said vehicle;
(d) said arms including respective sensor means mounted thereon, transversely movable relative to each other in unison with said arms, for sensing the presence of an object below, and transversely outside the area between, said clamp pad means; and
(e) control means responsive to said sensor means for preventing said lift means from lowering said arms in response to the sensing by said sensor means of the presence of an object.

18. The load clamp of claim 17 wherein said vehicle includes drive means for selectively moving at least a portion of said vehicle in a load-engaging direction, said clamp arms extending forwardly from said portion of said vehicle in said direction and being mounted on said vehicle so as to move in unison therewith in said direction, said control means including means for preventing said driven means from moving said portion of said vehicle forwardly in said direction in response to the sensing by said sensor means of an object.

19. In a driverless vehicle, a load clamp comprising:
(a) a pair of transversely openable and closeable arms extending forwardly from said vehicle in a load-engaging direction;
(b) said arms including respective clamp pad means for selectively releasably engaging a load, said clamp pad means being substantially horizontally opposed to each other;
(c) lift means on said vehicle for selectively raising and lowering said arms and said clamp pad means vertically with respect to said vehicle;
(d) said arms including sensor means for sensing the presence of a surface below said clamp pad means and sensing whether said surface is substantially level in a transverse direction relative to said arms;
(e) power means on said vehicle for selectively opening and closing said arms and said clamp pad means; and
(f) control means responsive to said sensor means for preventing said power means from closing said arms when said sensor means senses that said surface is not substantially level in said transverse direction with respect to said arms.

20. In a driverless vehicle, a load clamp comprising:
(a) a pair of transversely openable and closeable arms extending forwardly from said vehicle in a load-engaging direction;
(b) said arms including respective clamp pad means for selectively releasably engaging a load, said clamp pad means being substantially horizontally opposed to each other;
(c) lift means on said vehicle for selectively raising and lowering said arms and said clamp pad means vertically with respect to said vehicle;
(d) said arms including sensor means for sensing the presence of a surface below said clamp pad means and sensing whether said surface is substantially level in said load-engaging direction;
(d) power means on said vehicle for selectively opening and closing said arms and said clamp pad means; and
(e) control means responsive to said sensor means for preventing said power means from closing said arms when said sensor means senses that said surface is not substantially level in said load-engaging direction.

21. In a driverless vehicle, a load clamp comprising:
(a) a pair of transversely openable and closeable arms extending forwardly from said vehicle in a load-engaging direction, each of said arms respectively including an inner surface proximate said other one of said arms and an outer surface remote from said other one of said arms;
(b) said arms including respective clamp pad means for selectively releaseably engaging a load;
(c) power means on said vehicle for selectively opening and closing said arms and said clamp pad means;
(d) outer sensor means associated with the outer surfaces of said arms for sensing objects immediately adjacent to said outer surfaces of said arms; and
(e) control means responsive to said outer sensor means for preventing said power means from opening said arms when said outer sensor means senses an object immediately adjacent to the outer surface of one of said arms.

22. The load clamp of claim 21 wherein said outer sensor means includes feeler means supported on said arms and transversely movable inwardly with respect to said arms for moving inwardly in response to contact with an object.

23. In a driverless vehicle having drive means for selectively moving at least a portion of said vehicle in a load-engaging direction or stopping said vehicle, a load clamp comprising:
(a) a pair of transversely openable and closeable arms extending forwardly from said portion of said vehicle in said direction, each of said arms respectively including an inner surface proximate said other one of said arms and an outer surface remote from said other one of said arms;
(b) said arms including respective clamp pad means for selectively releasably engaging a load;
(c) outer sensor means associated with the outer surfaces of said arms for sensing objects immediately adjacent to said outer surfaces of said arms; and
(d) control means responsive to said outer sensor means for preventing said drive means from moving said portion of said vehicle when said outer sensor means senses an object immediately adjacent to the outer surface of one of said arms.

* * * * *

UNITED STATES PATENT AND TRADEMARK OFFICE
CERTIFICATE OF CORRECTION

PATENT NO. : 4,714,399

DATED : December 22, 1987

INVENTOR(S) : John E. Olson

It is certified that error appears in the above-identified patent and that said Letters Patent is hereby corrected as shown below:

| | |
|---|---|
| Col. 1, line 58 | Change "vehicle'3 s" to --vehicle's-- |
| Col. 2, line 12 | Change "likeiwse" to --likewise-- |
| Col. 6, line 67 | Change "adpated" to --adapted-- |
| Col. 8, line 52 | Change "shiled" to --shield-- |
| Col. 9, line 40 | Change "known" to --knows-- |
| Col. 9, line 67 | Change "deposted" to --deposited-- |
| Col. 10, line 56 | Change "foor" to --floor-- |
| Col. 11, lines 43-44 | Change "positions" to --portions-- |
| Col. 12, line 5 | After "of" insert --the-- |

UNITED STATES PATENT AND TRADEMARK OFFICE
CERTIFICATE OF CORRECTION

PATENT NO.  : 4,714,399

DATED       : December 22, 1987

INVENTOR(S) : John E. Olson

It is certified that error appears in the above-identified patent and that said Letters Patent is hereby corrected as shown below:

| | |
|---|---|
| Col. 14, line 15 | Change "set" to --sent-- |
| Col. 15, line 20 | Change "and" to --as-- |
| Col. 15, line 56 | Change "be" to --being-- |
| Col. 18, line 49 | Change "clap" to --clamp-- |
| Col. 19, line 8  | Change "driven" to --drive-- |

Signed and Sealed this

Twenty-ninth Day of November, 1988

Attest:

DONALD J. QUIGG

*Attesting Officer*    *Commissioner of Patents and Trademarks*